(12) United States Patent
Haba et al.

(10) Patent No.: US 10,597,872 B2
(45) Date of Patent: *Mar. 24, 2020

(54) ADJUSTABLE CLIP

(71) Applicant: Telling Industries, LLC, Willoughby, OH (US)

(72) Inventors: Charles Andrew Haba, Kirtland, OH (US); Thomas Dwayne Ogle, York, SC (US)

(73) Assignee: Telling Industries, LLC, Willoughby, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,056

(22) Filed: Jun. 14, 2019

(65) Prior Publication Data

US 2019/0292784 A1 Sep. 26, 2019

Related U.S. Application Data

(63) Continuation of application No. 15/987,061, filed on May 23, 2018, now Pat. No. 10,323,414.

(Continued)

(51) Int. Cl.
*E04C 3/07* (2006.01)
*E04B 2/58* (2006.01)
(Continued)

(52) U.S. Cl.
CPC .............. *E04C 3/07* (2013.01); *E04B 1/40* (2013.01); *E04B 2/58* (2013.01); *E04B 2/763* (2013.01); *E04B 2/789* (2013.01); *E04C 3/32* (2013.01); *F16B 5/0096* (2013.01); *F16B 7/0453* (2013.01); *F16M 13/02* (2013.01); *E04B 2001/405* (2013.01); *E04B 2002/7488* (2013.01); *E04B 2103/06* (2013.01);
(Continued)

(58) Field of Classification Search
CPC ........ E04C 3/07; E04C 3/32; E04C 2003/026; E04C 2003/0473; E04B 2/763; E04B 2/789; E04B 1/40; E04B 2/58; E04B 2002/7488; E04B 2001/405; E04B 2103/06; F16B 5/0096; F16M 13/02
See application file for complete search history.

(56) References Cited

U.S. PATENT DOCUMENTS 3,294,428 A * 12/1966 Lickliter ................. E04B 9/067
403/52
4,193,247 A * 3/1980 Heckelsberg ........... E04D 3/361
403/206

(Continued)

*Primary Examiner* — Jessie T Fonseca
(74) *Attorney, Agent, or Firm* — Edwin A. Sisson, Attorney at Law, LLC; Jeffrey J. Banyas

(57) ABSTRACT

It is described herein an adjustable rigid clip assembly comprising an anchor plate joined with a connector plate and a slide plate. The anchor plate is joined with the connector plate at a juncture having a juncture angle between the anchor plate and the connector plate in a range of between 0° and less than 180°. The connector plate comprises at least one connector plate slot and at least one connector plate lock. The slide plate may comprise at least one slide plate lock. The at least one slide plate lock may be engaged with the at least one connector plate lock. The slide plate may further comprise at least one slide plate tab passing from the slide plate through the at least one connector plate slot.

16 Claims, 13 Drawing Sheets

Related U.S. Application Data

(60) Provisional application No. 62/643,925, filed on Mar. 16, 2018, provisional application No. 62/644,050, filed on Mar. 16, 2018, provisional application No. 62/645,223, filed on Mar. 20, 2018, provisional application No. 62/662,839, filed on Apr. 26, 2018, provisional application No. 62/663,431, filed on Apr. 27, 2018, provisional application No. 62/663,481, filed on Apr. 27, 2018.

(51) Int. Cl.
| | |
|---|---|
| *E04B 2/76* | (2006.01) |
| *E04B 2/78* | (2006.01) |
| *E04C 3/32* | (2006.01) |
| *F16B 7/04* | (2006.01) |
| *E04B 1/41* | (2006.01) |
| *F16B 5/00* | (2006.01) |
| *F16M 13/02* | (2006.01) |
| *E04C 3/04* | (2006.01) |
| *E04C 3/02* | (2006.01) |
| *E04B 2/74* | (2006.01) |
| *F16B 5/02* | (2006.01) |
| *E04B 1/38* | (2006.01) |

(52) U.S. Cl.
CPC ...... *E04C 2003/026* (2013.01); *E04C 2003/0473* (2013.01); *F16B 5/02* (2013.01)

(56) References Cited

U.S. PATENT DOCUMENTS

| | | | | |
|---|---|---|---|---|
| 4,213,282 | A * | 7/1980 | Heckelsberg | E04D 3/362 52/404.2 |
| 4,514,952 | A * | 5/1985 | Johansson | E04D 3/362 52/520 |
| 4,575,983 | A * | 3/1986 | Lott, Jr. | E04D 3/363 52/520 |
| 4,796,403 | A * | 1/1989 | Fulton | E04D 3/362 52/478 |
| 5,001,882 | A * | 3/1991 | Watkins | E04D 3/362 52/478 |
| 5,222,341 | A * | 6/1993 | Watkins | E04D 3/362 52/478 |
| 7,137,227 | B2 * | 11/2006 | Franz | E04B 1/38 52/243.1 |
| 7,730,694 | B1 * | 6/2010 | Simpson | E04D 3/361 52/520 |
| 7,984,596 | B1 * | 7/2011 | Simpson | E04D 3/364 52/478 |
| 8,122,667 | B2 * | 2/2012 | Ferge | E04D 3/361 52/544 |
| 8,763,336 | B2 * | 7/2014 | Gulbrandsen | E04B 9/10 52/288.1 |
| 9,834,934 | B1 * | 12/2017 | Hodges, Jr. | E04D 3/364 |
| 2017/0342714 | A1 * | 11/2017 | Babcock | E04D 3/362 |
| 2018/0002936 | A1 * | 1/2018 | Murphy | E04G 13/00 |

* cited by examiner

ADJUSTABLE CLIP

CROSS REFERENCES AND PRIORITIES

This application claims the benefit of priority of U.S. application Ser. No. 15/987,061 filed on 23 May 2018 and U.S. Provisional Application Nos. 62/643,925 filed on 16 Mar. 2018, 62/644,050 filed on 16 Mar. 2018, 62/645,223 filed on 20 Mar. 2018; 62/666,481 filed on 27 Apr. 2018; 62/663,431 filed on 27 Apr. 2018 and 62/662,839 filed on 26 Apr. 2018; the teachings of each of which are incorporated by reference herein in their entirety.

BACKGROUND

Clips are used in non-residential building and construction to securely connect one metal framing component to either another metal framing component or a structural building component.

U.S. Pat. No. 5,906,080 (the "080 patent") discloses such a clip. The apparatus [described in the '080 patent] is a bracket with a first plate for mounting to the primary structure and a second plate for mounting in sliding relation to the wall studs. The second plate is formed with slots which are vertically oriented, a fastener with a spacer are fastened through each slot.

According to claim 1 of the '080 patent, the bracket disclosed therein has " . . . a first plate having a linear edge; and a second plate having a selected thickness and a second linear edge and being integrally connected to the said first plate with said first linear edge and said second linear edge coinciding, said second plate formed with at least one linear slot therethrough, said slot having a selected width."

U.S. Pat. No. 8,181,419 (the "419 patent") states that "[f]or a more complete and detailed description of such connection devices, reference is made to U.S. Pat. Nos. 5,906,080; 6,612,087; 5,467,566; and 7,503,150; . . . ."

The '419 patent goes on to state that "[t]he degree to which such devices function as intended is dependent upon proper installation. For example, should a shouldered screw be inserted and tightened off center in the slot, the shoulder would overlap and clamp the plate to the member. This clamping would render the connection more or less rigid and not slideable. Avoiding this kind of improper installation requires time and installer dexterity to properly align the screw in the slot."

While the two preceding references refer to clips where the member—e.g. strut—slides in the clip, there are also several types of fixed clips. There are over 20 different design iterations of clips with varying lengths, widths, thicknesses, and hole patterns.

The prior art clips are typically transported to and within the job site in 5 gallon plastic buckets. For example, if one needs seven (7) different types of clips for a job on the $5^{th}$ floor of a building, then one orders and hauls 7 separate 5 gallon buckets up the elevator or stairs to the $5^{th}$ floor, each bucket containing a different type of clip.

There is therefore a need for an adjustable clip to replace the multiple non-adjustable clips, and that will enable distributors to stock and inventory fewer types of clips, reduce warehousing complexity, and thus reduce their costs. The reduced number of clip designs will also allow contractors and builders to reduce the complexity of clip management and haulage at the job site. For instance, in the preceding example, one would only need a single 5 gallon bucket containing a single type of clip instead of the 7 different buckets each containing a different type of clip.

SUMMARY

Disclosed herein is an adjustable rigid clip assembly which may comprise an anchor plate, a connector plate, and a slide plate. The anchor plate may be joined with the connector plate at a juncture having a juncture angle ($\Theta$) between the anchor plate and the connector plate in a range of between 0° and less than 180°. The connector plate may optionally comprise at least one connector plate slot and at least one connector plate lock. The slide plate may optionally comprise at least one slide plate lock with the at least one slide plate lock engaged with the at least one connector plate lock. The slide plate may further comprise at least one slide plate tab with the at least one slide plate tab passing from the slide plate through the at least one connector plate slot. There may be a tilt angle ($\alpha$) in the range of greater than 0° and less than about 90° formed by the at least one connector plate slot and the juncture.

The anchor plate and the connector plate may be of a unitary construction. The juncture may be a bend.

The juncture angle ($\Theta$) may be in a range of between about 60° and about 120°. The juncture angle ($\Theta$) may be about 90°.

The anchor plate may comprise at least one anchor plate rib. The anchor plate rib may be substantially perpendicular to the juncture.

The connector plate may comprise at least two connector plate locks and the slide plate may comprise at least two slide plate locks. Each of the at least two connector plate locks may be engaged with a corresponding slide plate lock.

The connector plate may comprise at least two connector plate slots and the slide plate may comprise at least two slide plate tabs. Each of the slide plate tabs may pass from the slide plate through a corresponding connector plate slot.

Each of the connector plate locks may be substantially parallel to each of the connector plate slots.

The anchor plate may further comprise a plurality of anchor plate holes. The connector plate may further comprise a plurality of connector plate holes. The slide plate may further comprise a plurality of slide plate holes. At least one of the plurality of slide plate holes may be a slide plate elongated hole.

At least one of the slide plate tabs may be bent around the connector plate and may have a slide plate tab bent over width.

At least one of the connector plate slots may extend through the juncture, and the anchor plate may have an anchor plate tab slot located at the juncture with one side of the anchor plate tab slot having an anchor plate tab slot width at least spanning a width of the at least one connector plate slots. The anchor plate tab slot width may span at least the slide plate tab bent over width.

At least one of the slide plate tabs may comprise a slide plate tab notch.

The connector plate may further comprise a plurality of connector plate slot holes.

The tilt angle may be in the range of greater than about 30° and less than about 60°. The tilt angle may be about 45°.

DETAILED DESCRIPTION

Figure 1:
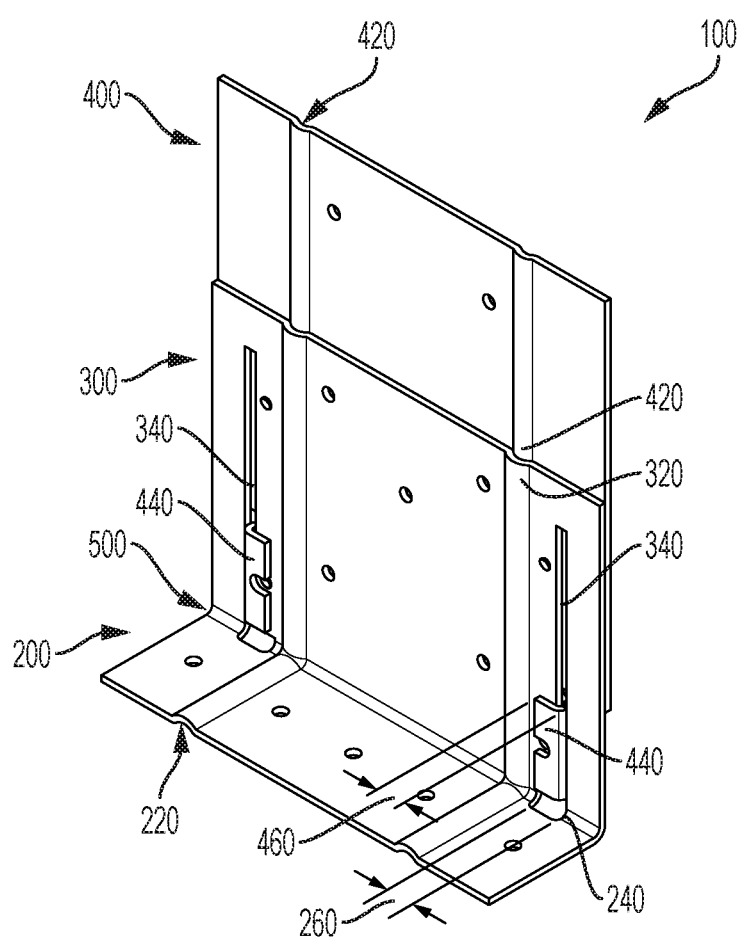
FIG. 1 depicts one embodiment of the assembled adjustable rigid clip.

This specification is best understood by referring to FIG. 1 which is a detailed drawing of the invented adjustable rigid clip assembly. Reference will now be made to the various Figures in which, unless otherwise noted, like numbers refer to like structures. As described herein and in the claims, the following numbers refer to the following structures as noted in the Figures.

100 refers to the rigid clip assembly.
200 refers to the anchor plate.
220 refers to the anchor plate rib.
240 refers to the anchor plate tab slot.
260 refers to the anchor plate tab slot width.
280 refers to the anchor plate holes.
300 refers to the connector plate.
320 refers to the connector plate locks.
340 refers to the connector plate slots.
360 refers to the connector plate holes
380 refers to the connector plate slot holes.
400 refers to the slide plate.
420 refers to the slide plate locks.
440 refers to the slide plate tabs.
450 refers to the slide plate elongated holes.
460 refers to the slide plate tab bent over width.
480 refers to the slide plate tab notch.
490 refers to the slide plate holes.
500 refers to the juncture of the connector plate and the anchor plate.
Θ refers to the juncture angle between the anchor plate and the connector plate.
α refers to the tilt angle of the connector plate slots with the juncture.

As depicted in FIG. 1, the adjustable rigid clip assembly comprises a slide plate (400), and an anchor plate (200) joined to a connector plate (300). The slide plate may assemble to the anchor plate/connector plate by way of at least one slide plate tab (440) which passes from the slide plate through a corresponding connector plate slot (340).

As shown in FIG. 1, the anchor plate (200) and the connector plate are joined at juncture (500). The juncture could be a weld, glue, epoxy, or a bend. The preferred juncture is a bend so that the anchor plate and the connector plate may be of unitary construction. That is the anchor plate and the connector plate may be made from the same piece of material. The material of construction is preferably a metal. Examples of such metal include steel, stainless steel, iron, aluminum, copper, brass, titanium, and the like.

The anchor plate (200) may further comprise at least one anchor plate rib (220) as shown in FIG. 1. In some embodiments, the anchor plate will comprise two or more anchor plate ribs. Each of the anchor plate rib(s) may be substantially perpendicular to the juncture (500). These anchor plate ribs provide increased strength to the assembly at the anchor plate.

The connector plate (300), which is connected to the anchor plate (200) at the juncture (500), may also optionally comprise at least one connector plate lock (320) as shown in FIG. 1. In some embodiments, the connector plate will comprise two or more connector plate locks (320). Similarly, the slide plate may optionally comprise at least one slide plate lock (420). As shown in FIG. 1, the slide plate (400) comprises two slide plate locks with each slide plate lock mated to and engaged with a corresponding connector plate lock. The engagement between the connector plate locks and the slide plate locks serves to reduce or prevent undesirable movement between the connector plate and slide plate during installation.

The connector plate lock(s) (320) and the slide plate lock(s) may take on many embodiments. As shown in FIG. 1, the connector plate lock(s) is/are a groove(s) while the slide plate lock(s) is/are a ridge(s) mated to fit into the groove(s) that are the connector plate lock(s). In this manner the connector plate lock(s) may be engaged with the slide plate lock(s). As shown in FIG. 1, the connector plate lock of this embodiment may be substantially perpendicular to the juncture (500).

In an alternative embodiment, the connector plate lock(s) may be an indentation or a series of indentations, and the slide plate lock(s) may be a dimple or a series of dimples which may mate with and be engaged with a corresponding indentation of the connector plate lock(s).

Preferably, the connector plate (300) comprises at least two connector plate slots (340) as shown in FIG. 1. The connector plate slots (340) may be substantially parallel to one another. In some embodiments, the connector plate slots may be perpendicular or substantially perpendicular to the juncture (500). The connector plate slots allow the slide plate to move perpendicularly or substantially perpendicularly to the juncture (500).

In some embodiments, such as shown in FIG. 1, one or more of the slide plate tab(s) (440) may be bent over or alternatively, around the connector plate (300). When each of the two slide plate tabs (440) are bent over, or alternatively, around the connector plate, the slide plate tab(s) will have a slide plate tab bent over width (460) as shown in FIG. 1. The slide plate tab bent over widths do not have to be the same width dimension for each slide plate tab, but in practice they usually are.

The slide plate tab(s) (440) function in the installation of the adjustable clip. The slide plate tab(s) can be hammered or pressed until it/they frictionally engage with the connector plate (300). This pre-aligns the connector plate with the slide plate (400) for easier installation of fasteners, such as screws or bolts, to connect with the piece being mounted and anchored, such as a stud to a beam, or a stud to a concrete floor.

In some embodiments, such as that shown in FIG. 1, at least one of the connector plate slots (340) may extend through the juncture (500). In such embodiments, the anchor plate (200) may have an anchor plate tab slot (240) located at the juncture with one side of the anchor plate tab slot having an anchor plate tab slot width (260). The anchor plate tab slot width may at least span the slide plate tab bent over width.

Figure 2A:
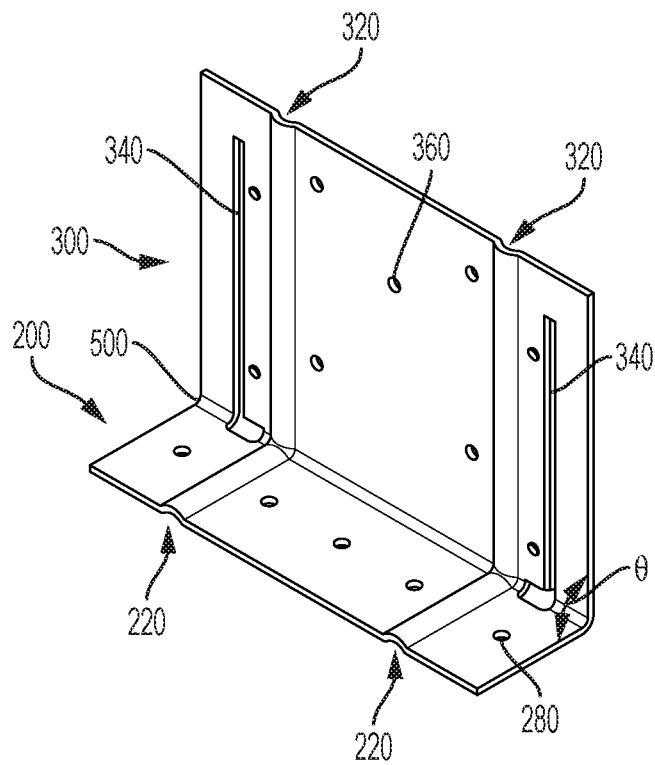
FIG. 2A depicts a perspective view of the anchor plate and connector plate of an embodiment of the adjustable clip.

FIG. 2A shows a perspective view of an embodiment of the anchor plate (200) joined to the connector plate (300). As shown in FIG. 2A, the juncture has a juncture angle (Θ) between the anchor plate (200) and the connector plate (300). The juncture angle may be in a range of between 0° and less than 180°. More preferably, the juncture angle may be in a range of between about 60° and about 120°. Most preferably, the juncture angle may be about 90°.

The anchor plate (200) exists to secure the adjustable clip assembly to a mounting surface such as a concrete floor. Accordingly, the anchor plate may comprise anchor plate holes (280) as shown in FIG. 2A for passing a fastener, such as a screw or bolt, through the anchor plate and into the mounting surface.

The connector plate (300) may also comprise a plurality of connector plate holes (360). The connector plate holes may be used to further secure the connector plate to the slide plate (400) by passing a fastener, such as a screw or bolt, through a connector plate hole and a corresponding hole in the slide plate. The connector plate holes may also be used to secure the adjustable clip assembly to a stud or other item which is being anchored to the mounting surface by passing a fastener, such as a screw or bolt, through the connector plate hole (and optionally through a corresponding hole in the slide plate) and into the stud or other item being anchored to the mounting surface.

Figure 2B:
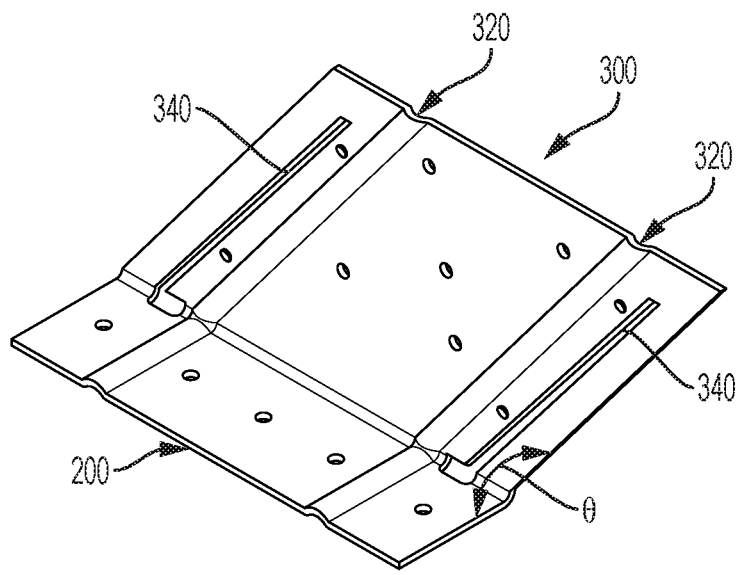
FIG. 2B depicts a perspective view of the anchor plate and connector plate of a separate embodiment of the adjustable clip.

FIG. 2B shows a perspective view of a different embodiment the anchor plate (200) joined to the connector plate (300). As shown in FIG. 2B, the juncture has a juncture angle (Θ) between the anchor plate (200) and the connector plate (300). However, the connector plate is tilted so that the connector slots (340) form a tilt angle (α) with the juncture. Which in this embodiment is not 90° as it is in the embodiment in FIG. 2A. The tilt angle may be in a range of between 0° and less than 90°. More preferably, the tilt angle may be in a range of between about 30° and about 60°. Most preferably, the tilt angle may be about 45°.

Figure 3A:
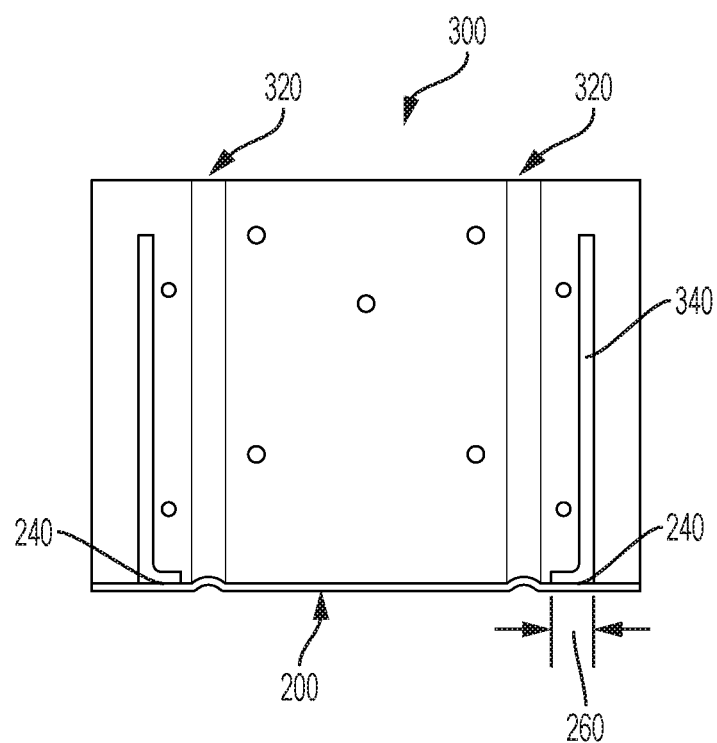
FIG. 3A depicts a front view of an embodiment of the anchor plate and connector plate of the adjustable clip shown in FIG. 2A.
Figure 4A:
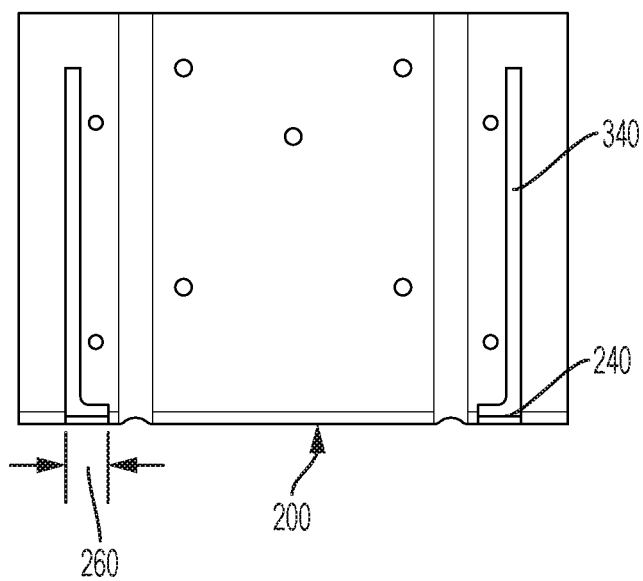
FIG. 4A depicts a back view of the embodiment of the anchor plate and connector plate of the adjustable clip shown in FIG. 2A.

FIG. 3A and FIG. 4A show a front view and back view respectively of the anchor plate (200) joined to the connector plate (300) of the embodiment in FIG. 2A. As shown in FIG. 3A and FIG. 4A, the anchor plate slot width (260) extends through the juncture and partially up the surface of the connector plate (300) before meeting with the connector plate slot (340).

Figure 3B:
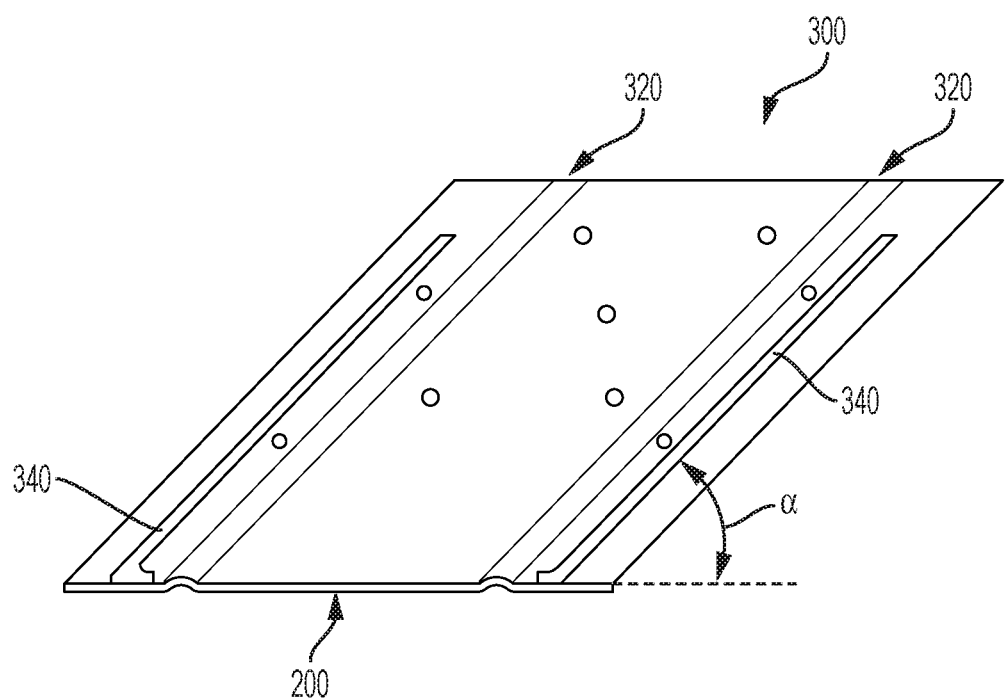
FIG. 3B depicts a front view of an embodiment of the anchor plate and connector plate of the adjustable clip shown in FIG. 2B.
Figure 4B:
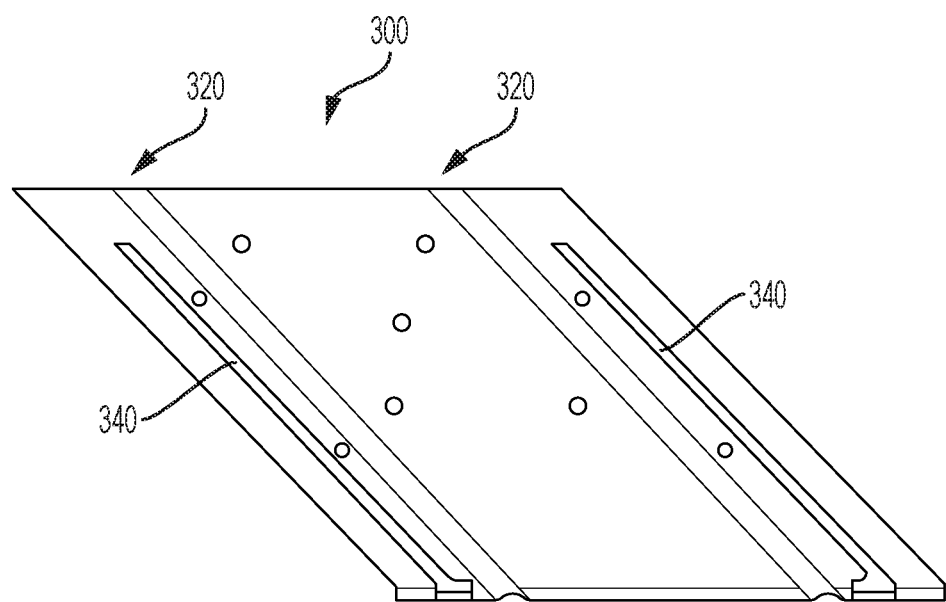
FIG. 4B depicts a back view of the embodiment of the anchor plate and connector plate of the adjustable clip shown in FIG. 2B.

Analogously, FIG. 3B and FIG. 4B show a front view and back view respectively of the anchor plate (200) joined to the connector plate (300) of the embodiment in FIG. 2B. Like FIG. 2B, the connector plate is tilted so that the connector slots (340) form a tilt angle (α) with the juncture. In this embodiment, the tilt angle is not 90° as it is in the embodiment in FIG. 2A. The tilt angle may be in a range of between 0° and less than 90°. More preferably, the tilt angle may be in a range of between about 30° and about 60°. Most preferably, the tilt angle may be about 45°.

Figure 5:
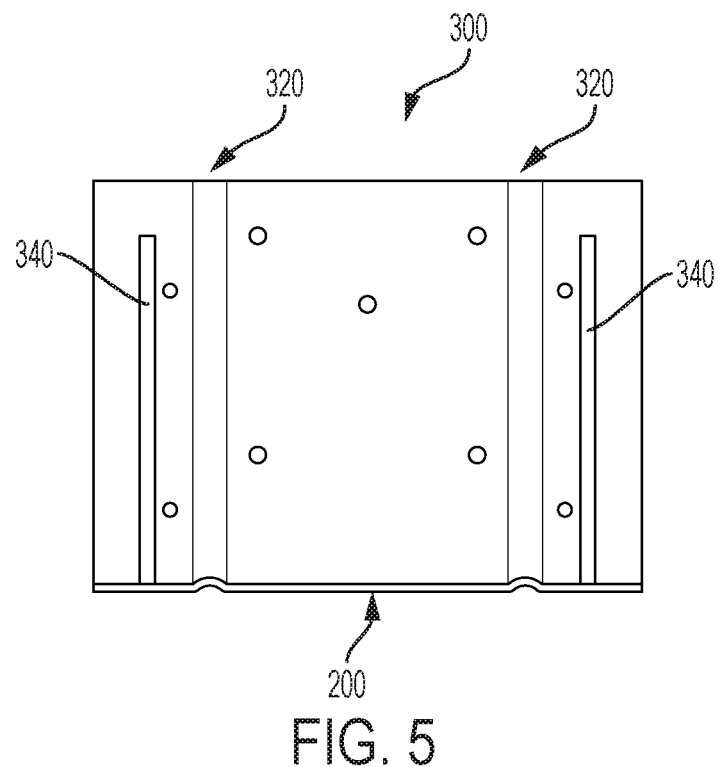
FIG. 5 depicts a front view of a different embodiment of the anchor plate and connector plate of the adjustable clip.

FIG. 5 shows a front view of an alternative anchor plate (200) joined to the connector plate (300). As shown in FIG. 5, the anchor plate may not comprise an anchor plate tab slot having an anchor plate tab slot width. In such an embodiment, the connector plate slots (340) may not extend through the juncture (500).

Figure 6:
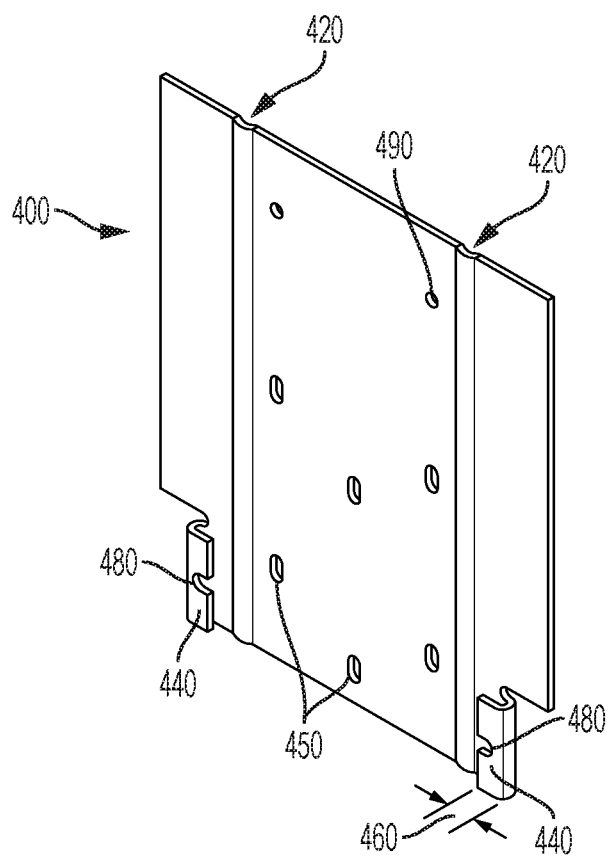
FIG. 6 depicts a perspective view of an embodiment of the slide plate of the adjustable clip.
Figure 7:
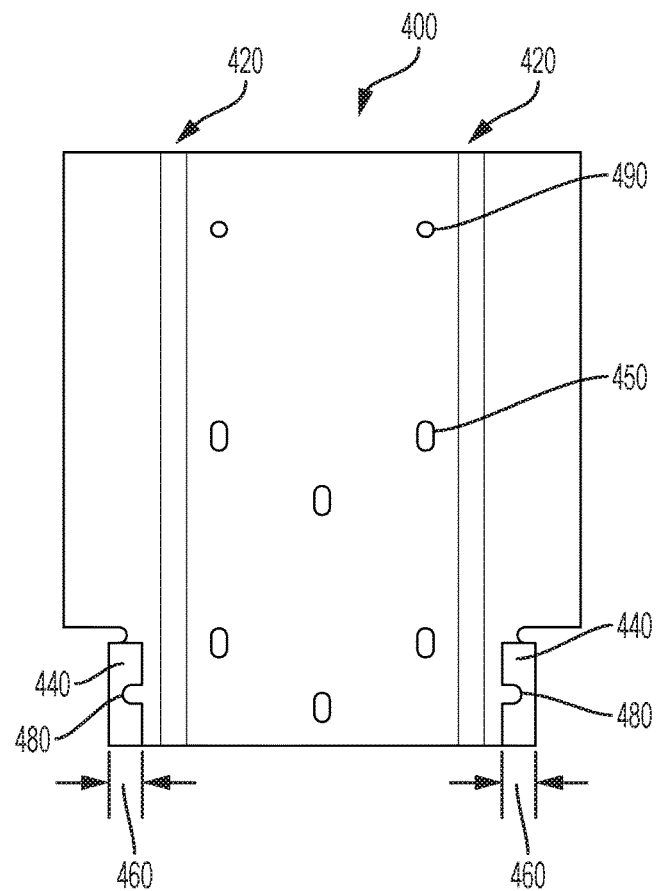
FIG. 7 depicts a front view of the embodiment of the slide plate of the adjustable clip shown in FIG. 6.
Figure 8:
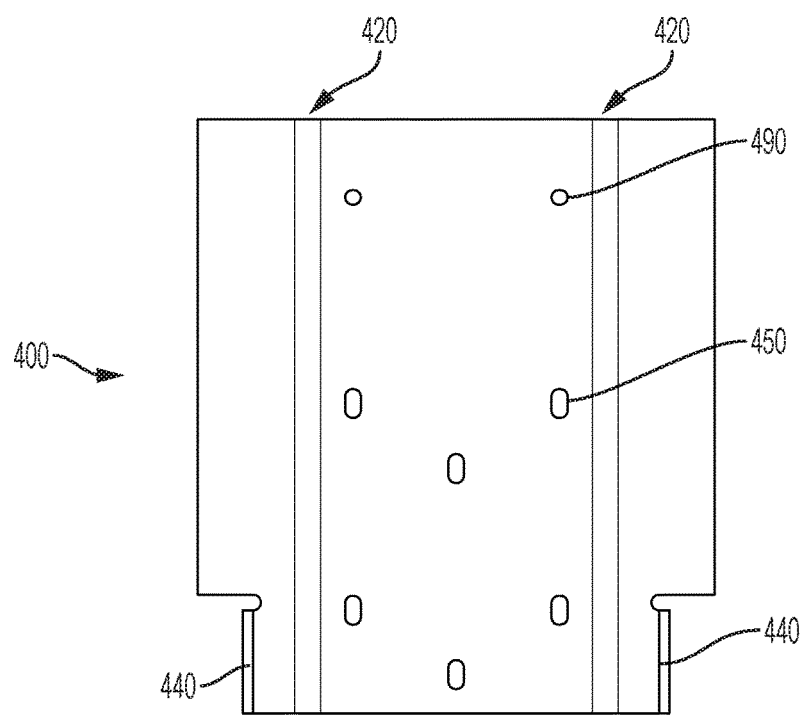
FIG. 8 depicts a back view of the embodiment of the slide plate of the adjustable clip shown in FIG. 6.

FIG. 6, FIG. 7, and FIG. 8 show a perspective view, a front view, and a back view respectively of an embodiment of a slide plate (400). As shown in FIG. 6, the slide plate tabs (440) are pre-bent, meaning that the slide plate tabs have a slide plate tab bent over width (460) prior to assembling the slide plate with the anchor plate which is joined to the connector plate. One or more of the slide plate tabs may further comprise a slide plate tab notch (480). The notch is superior to a hole as a hole is likely to go out of round during the bending process. The installer uses the notch to put a screw into the connector plate to fix the position of the slide plate.

As shown in FIG. 6 to FIG. 8, the slide plate may comprise a plurality of slide plate holes (490). The slide plate holes may be used to further secure the connector plate to the slide plate by passing a fastener, such as a screw or bolt, through a slide plate hole and a corresponding connector plate hole. The slide plate holes may also be used to secure the adjustable clip assembly to a stud or other item which is being anchored to the mounting surface by passing a fastener, such as a screw or bolt, through the slide plate hole (and optionally through a corresponding hole in the connector plate) and into the stud or other item being anchored to the mounting surface.

At least one of the plurality of slide plate holes may be a slide plate elongated hole (450). The slide plate elongated hole(s) may allow slideable movement between the slide plate and the connector plate when the slide plate elongated holes are used to secure the connector plate to the slide plate by passing a fastener, such as a screw or bolt, through the slide plate elongated hole and a corresponding connector plate hole.

Figure 9A:
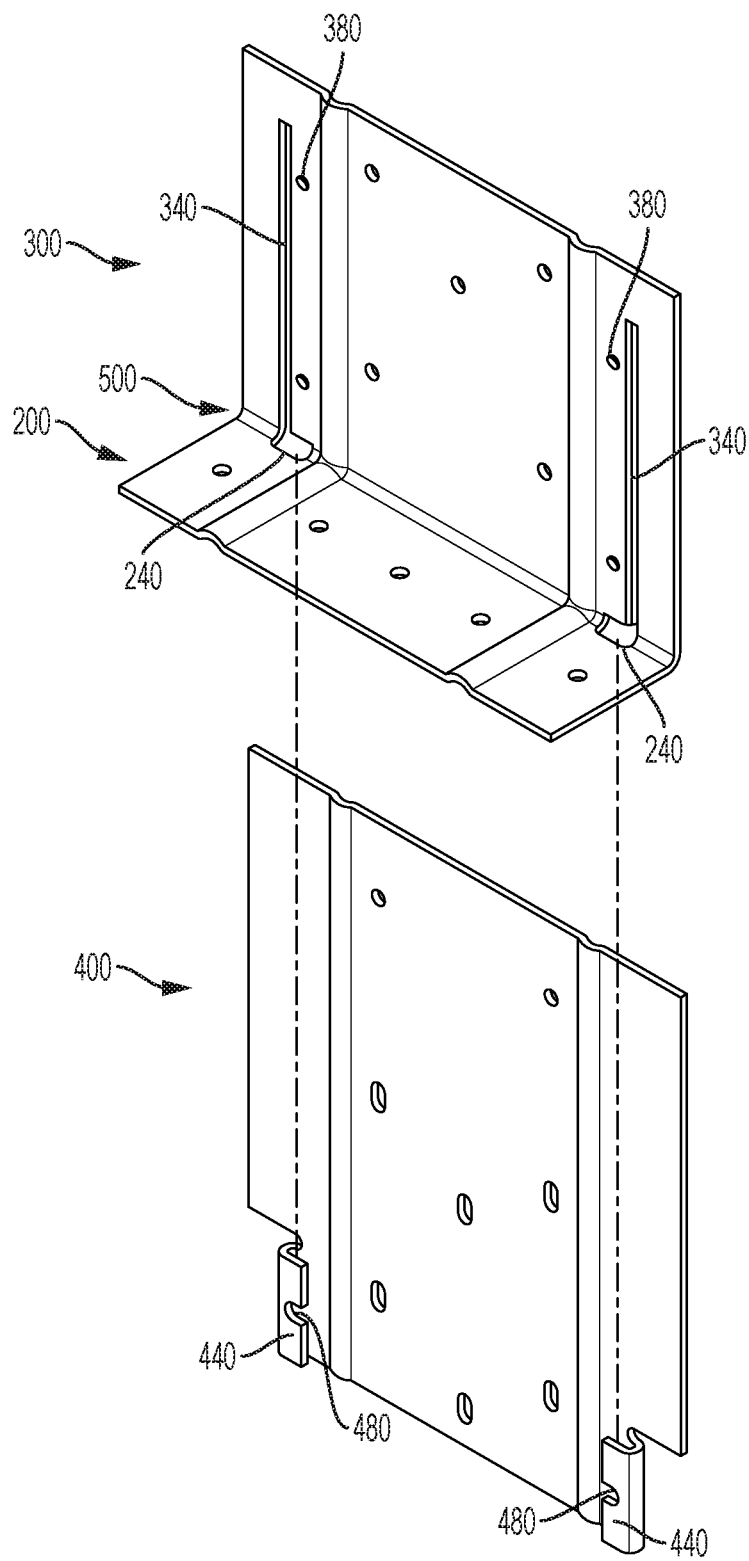
FIG. 9A depicts a view of one embodiment of how the slide plate and the anchor plate are assembled.

FIG. 9A shows one embodiment of a method of assembling an adjustable rigid clip assembly. In this embodiment, the slide plate tabs (440) are pre-bent, while the connector plate slots (340) extend through the juncture (500) and the anchor plate (200) has an anchor plate tab slot (240) with one side of the anchor plate tab slot having an anchor plate tab slot width at least spanning the slide plate tab bent over width.

As shown in FIG. 9A, the slide plate tabs (440), which are pre-bent, pass through the anchor plate tab slots (240) and slide into the connector plate slots (340). FIG. 9A also shows connector plate slot holes (380) in the connector plate located proximate to the connector plate slots (340). These connector plate slot holes may be used to affix the slide plate to the connector plate by passing a fastener, such as a screw or bolt, through the slide plate tab notch (480) and the connector plate slot holes. In some embodiments, the slide plate tabs which have been pre-bent may be bent further to a position where they engage a face of the connector plate to hold the slide plate in place during or after installation. In so doing, one-handed installation is facilitated as well.

Figure 9B:
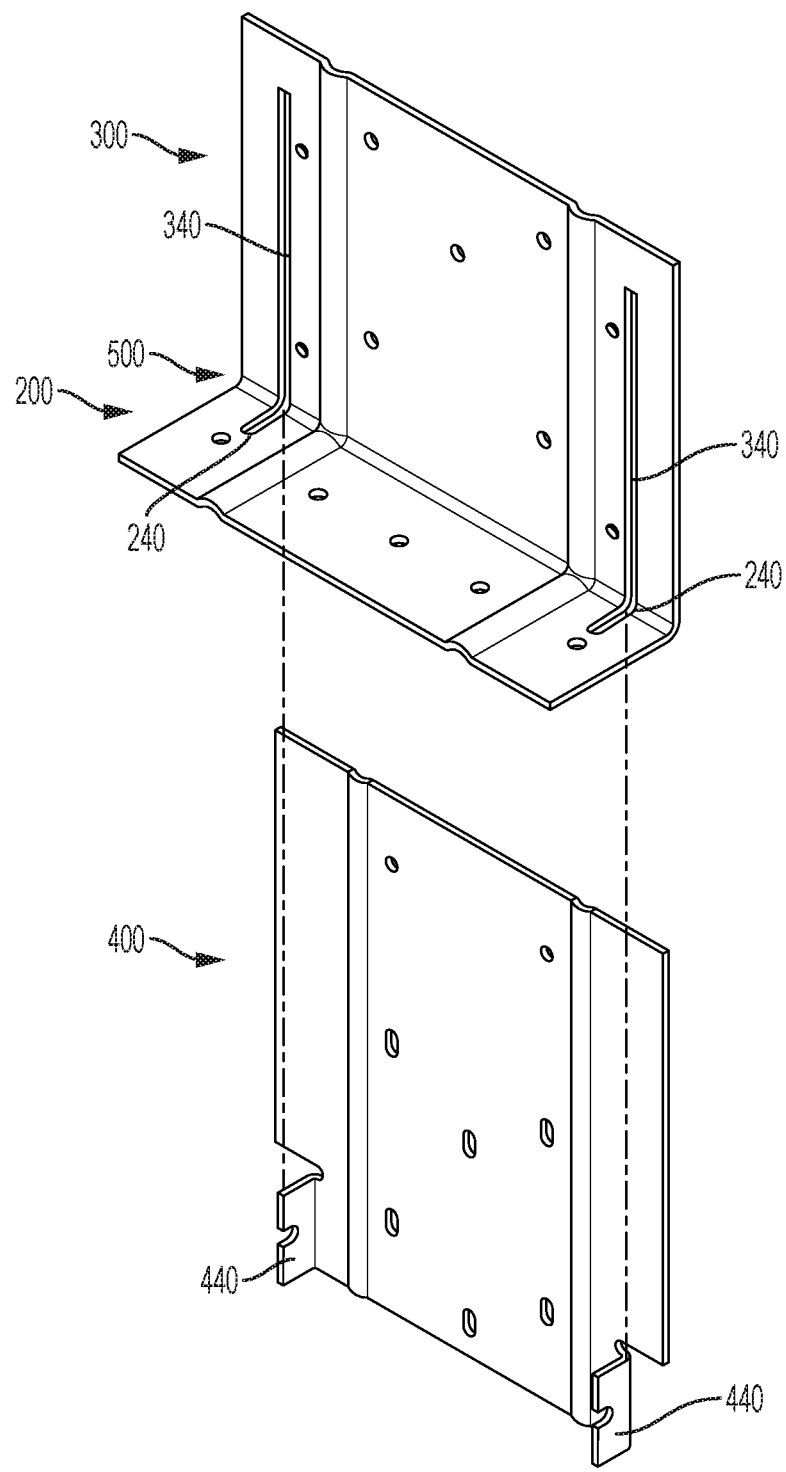
FIG. 9B depicts a view of a different embodiment of how the slide plate and the anchor plate are assembled.

FIG. 9B shows a separate embodiment of a method of assembling an adjustable rigid clip assembly. In this embodiment, the slide plate tabs (440) are not pre-bent. The connector plate slots (340) extend through the juncture (500) and the anchor plate (200) has an anchor plate tab slot (240). However, in the embodiment in FIG. 9B, the anchor plate tab slot width is less than the slide plate tab bent over width.

As shown in FIG. 9B, the slide plate tabs (440) pass through the anchor plate tab slots (240) and slide into the connector plate slots (340). Optionally, after passing the slide plate tabs through the anchor plate tab slots and into the connector plate slots, the slide plate tabs may be bent over to form a slide plate tab bent over tab width which will not allow the slide plate to slide back through the anchor plate tab slots without un-bending the slide plate tabs.

Figure 9C:
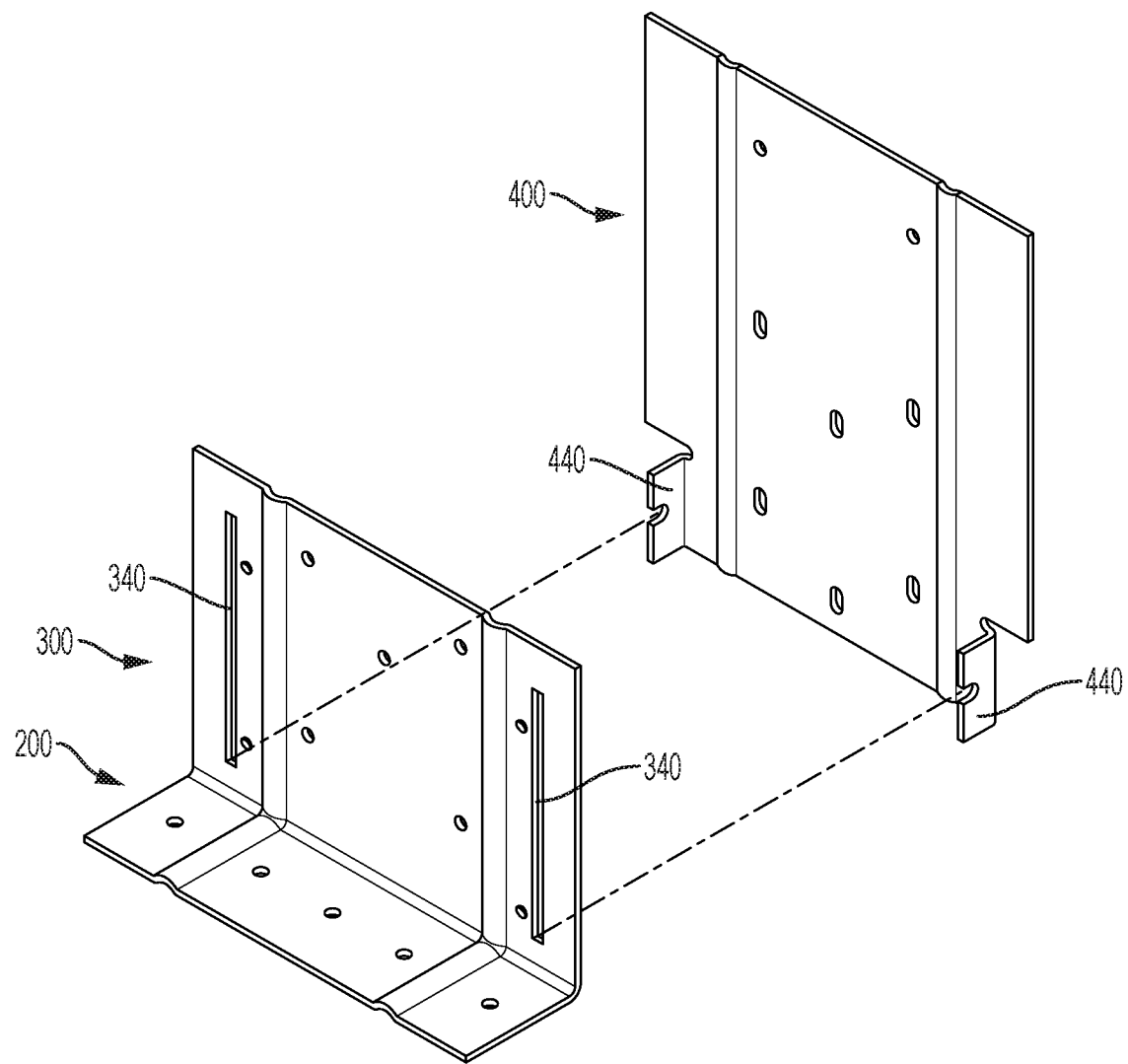
FIG. 9C depicts a view of a different embodiment of how the slide plate and the anchor plate are assembled.

FIG. 9C shows a separate embodiment of a method of assembling an adjustable rigid clip assembly. In this embodiment, the slide plate tabs (440) are not pre-bent. Also in this embodiment, the connector plate slots (340) do not extend through the juncture (500), and the anchor plate (200) does not have anchor plate tab slots (240).

As shown in FIG. 9C, the slide plate tabs (440) pass through the connector plate tab slots (340). Optionally, after passing the slide plate tabs through the connector plate tab slots (340), the slide plate tabs may be bent over to form a slide plate tab bent over tab width which will not allow the slide plate tabs to slide back through the connector plate tab slots without un-bending the slide plate tabs.

Figure 10A:
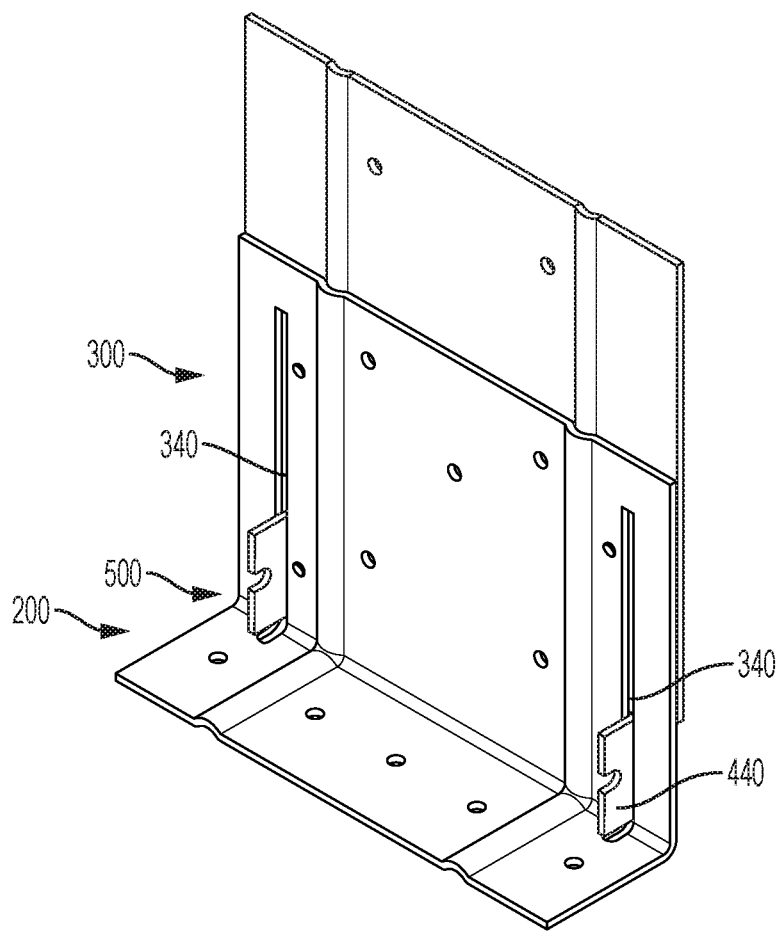
FIG. 10A depicts a view of a step of assembling the slide plate and anchor plate of FIG. 9C.
Figure 10B:
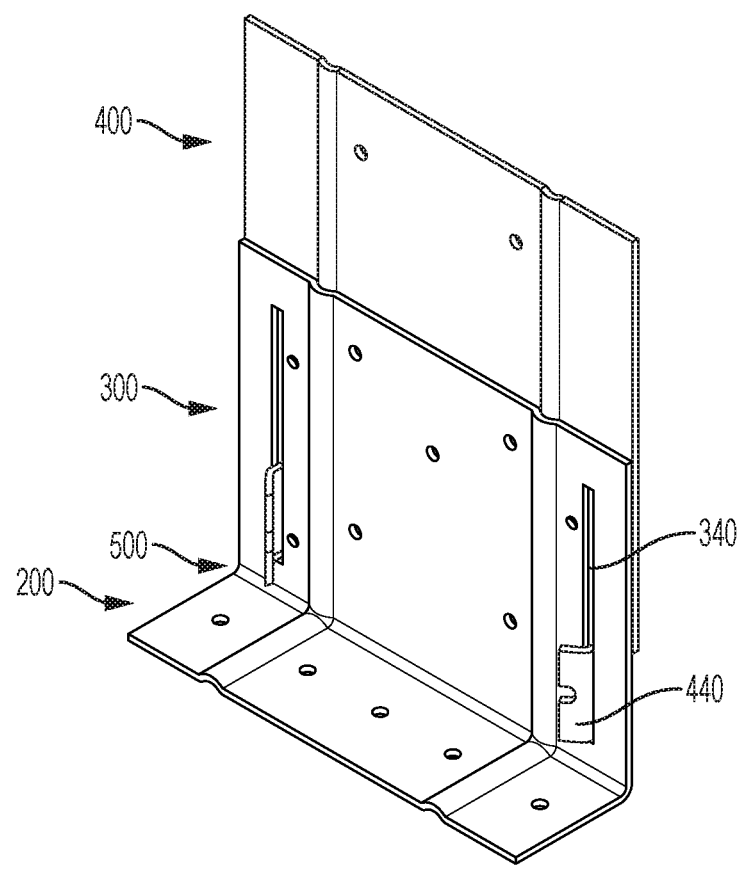
FIG. 10B depicts a view of a separate step of assembling the slide plate and anchor plate of FIG. 9C.
Figure 10C:
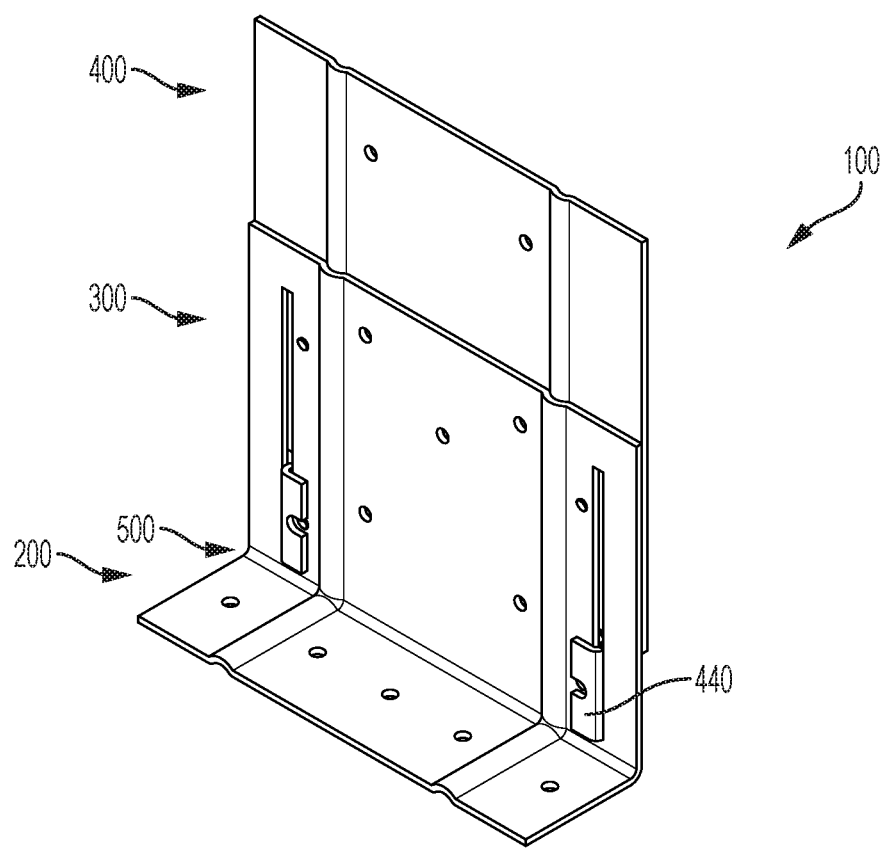
FIG. 10C depicts a view of a separate step of assembling the slide plate and anchor plate of FIG. 9C.

FIG. 10A to FIG. 10C shows an embodiment of a method for assembling an adjustable rigid clip assembly comprising slide plate tabs (440) which are not pre-bent, and then bending the slide plate tabs. First, the slide plate tabs, which are not pre-bent, pass through the connector plate tab slots (340) as shown in FIG. 10A. Next, the operator begins to bend the slide plate tabs as shown in FIG. 10B. FIG. 10C shows the slide plate tabs fully bent over so that the slide plate tabs cannot slide back through the connector plate tab slots without un-bending the slide plate tabs. In some embodiments, the slide plate tabs may be bent to a position where they engage a face of the connector plate to hold the slide plate in place during or after installation. In so doing, one-handed installation is facilitated as well.

Figure 11:
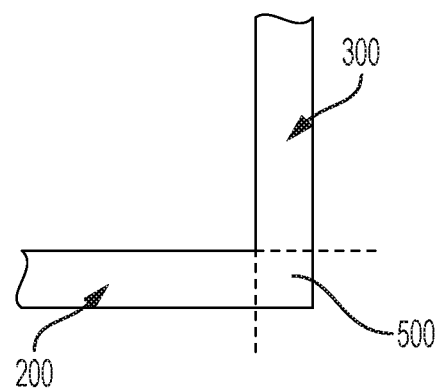
FIG. 11 depicts a side view of the juncture between an anchor plate and a connector plate.

As shown in FIG. 11, the juncture (500) is the intersection of the anchor plate (200) and the connector plate (300), and corresponds to the thickness of the anchor plate and connector plate.

It is not considered necessary that each combination of slide plate tabs and connector plate slots be of the same configuration. For example, in some embodiments, one slide plate tab may be pre-bent and the corresponding connector plate slot may extend through the juncture with the anchor plate having an anchor plate tab slot having an anchor plate tab slot width corresponding to at least the width of the slide plate tab bent over width as shown in FIG. 9A, while a second slide plate tab may not be pre-bent as shown in FIG. 9B and the corresponding connector plate slot may extend through the juncture with the anchor plate having an anchor plate tab slot which may or may not have an anchor plate tab slot width corresponding to at least the width of the slide plate tab bent over width.

Bending the slide plate tabs (either pre-bending or post-bending) is not considered necessary. In some embodiments, one or more of the slide plate tab(s) will not be bent at all.

This assembly has been found to be very useful on construction job sites. By replacing many different brackets with one bracket, the amount of inventory and space taken at the actual site of installation is reduced. Time hunting for the right bracket is also eliminated.

What is claimed is:

1. An adjustable rigid clip assembly (100) comprising:
an anchor plate (200),
a connector plate (300), and
a slide plate (400),
wherein the anchor plate is joined with the connector plate at a juncture (500) having a juncture angle ($\Theta$) between the anchor plate and the connector plate in a range of between 0° and less than 180°,
the connector plate comprising at least a first connector plate slot (340),
the slide plate comprising at least one slide plate tab (440) with the at least one slide plate tab passing from the slide plate through the first connector plate slot,
and wherein there is a tilt angle ($\alpha$) in the range of greater than 0° and less than about 90° formed by the first connector plate slot and the juncture, wherein the at least one slide plate tab is bent around the connector plate and has a slide plate tab bent over width (460).

2. The adjustable rigid clip assembly of claim 1, wherein the at least one slide plate tab is bent around the connector plate and has a slide plate tab bent over width (460).

3. The adjustable rigid clip assembly of claim 2, wherein the first connector plate slot extends through the juncture, and the anchor plate has an anchor plate tab slot (240) located at the juncture with one side of the anchor plate tab slot having an anchor plate tab slot width (260) at least spanning a width of the at least one connector plate slot.

4. The adjustable rigid clip assembly of claim 3, wherein the anchor plate tab slot width spans at least the slide plate tab bent over width.

5. The adjustable rigid clip assembly of claim 4, wherein the at least one slide plate tab comprises a slide plate tab notch (480).

6. The adjustable rigid clip assembly of claim 3, wherein the at least one slide plate tab comprises a slide plate tab notch (480).

7. The adjustable rigid clip assembly of claim 2, wherein the at least one slide plate tab comprises a slide plate tab notch (480).

8. The adjustable rigid clip assembly of claim 1, wherein the first connector plate slot extends through the juncture, and the anchor plate has an anchor plate tab slot (240) located at the juncture with one side of the anchor plate tab slot having an anchor plate tab slot width (260) at least spanning a width of the at least one connector plate slot.

9. The adjustable rigid clip assembly of claim 8, wherein the anchor plate tab slot width spans at least the slide plate tab bent over width.

10. The adjustable rigid clip assembly of claim 9, wherein the at least one slide plate tab comprises a slide plate tab notch (480).

11. The adjustable rigid clip assembly of claim 8, wherein the at least one slide plate tab comprises a slide plate tab notch (480).

12. The adjustable rigid clip assembly of claim 1, wherein the at least one slide plate tab comprises a slide plate tab notch (480).

13. An adjustable rigid clip assembly (100) comprising:
an anchor plate (200),
a connector plate (300), and
a slide plate (400), wherein the anchor plate is joined with the connector plate at a juncture (500) having a juncture angle (θ) between the anchor plate and the connector plate in a range of between 0° and less than 180°, the connector plate comprising at least a first connector plate slot (340), the slide plate comprising at least one slide plate tab (440) with the at least one slide plate tab passing from the slide plate through the first connector plate slot, and wherein there is a tilt angle (α) in the range of greater than 0° and less than about 90° formed by the first connector plate slot and the juncture, wherein the first connector plate slot extends through the juncture, and the anchor plate has an anchor plate tab slot (240) located at the juncture with one side of the anchor plate tab slot having an anchor plate tab slot width (260) at least spanning a width of the at least one connector plate slot.

14. The adjustable rigid clip assembly of claim 13, wherein the first connector plate slot extends through the juncture, and the anchor plate has an anchor plate tab slot (240) located at the juncture with one side of the anchor plate tab slot having an anchor plate tab slot width (260) at least spanning a width of the at least one connector plate slot.

15. The adjustable rigid clip assembly of claim 14, wherein the at least one slide plate tab comprises a slide plate tab notch (480).

16. The adjustable rigid clip assembly of claim 13, wherein the at least one slide plate tab comprises a slide plate tab notch (480).

* * * * *